Patented Nov. 17, 1942

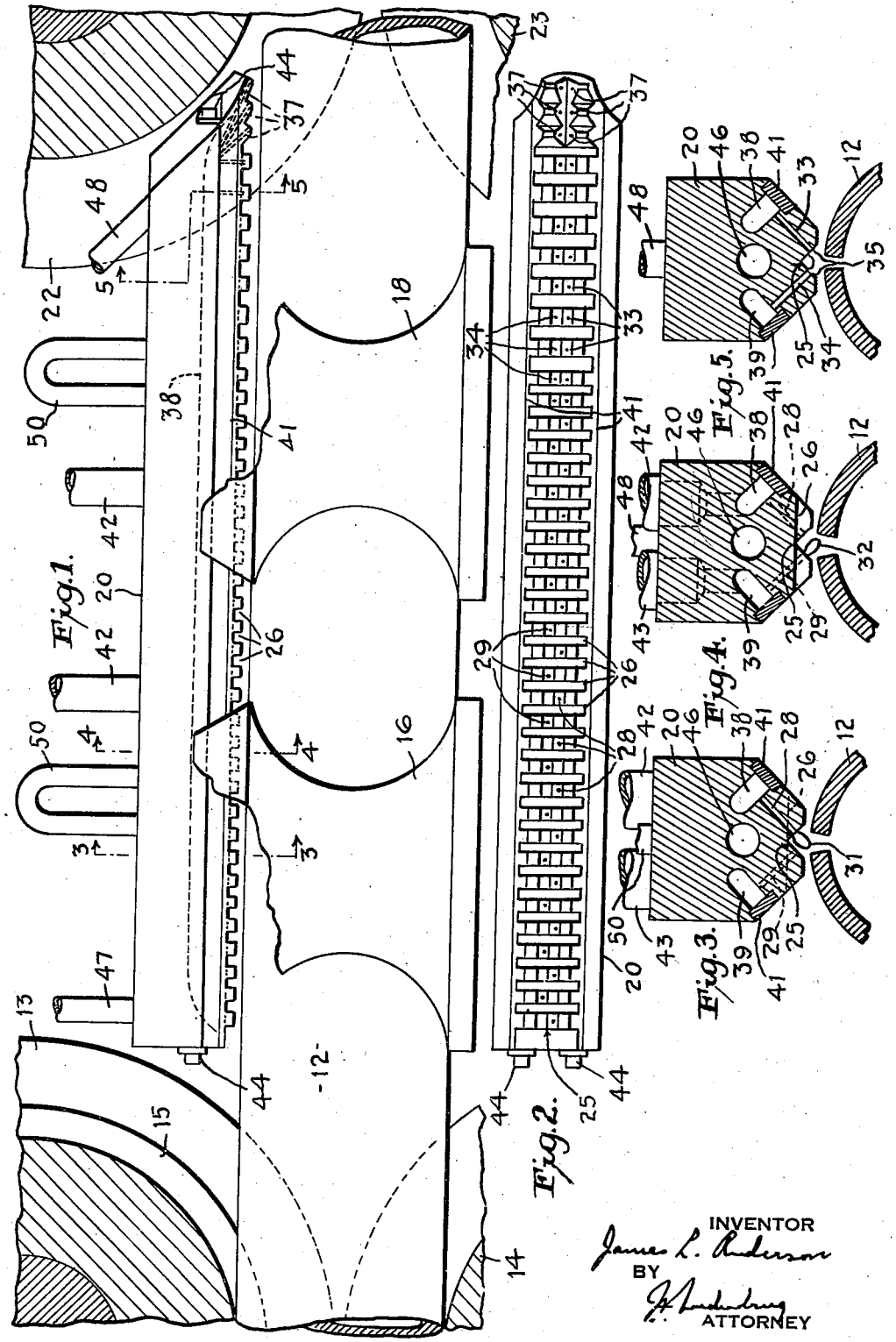

2,302,164

UNITED STATES PATENT OFFICE 2,302,164

WELDING TORCH

James L. Anderson, Closter, N. J., assignor to Air Reduction Company, Incorporated, New York, N. Y., a corporation of New York Application May 17, 1940, Serial No. 335,691

3 Claims. (Cl. 158—27.4)

This invention relates to torches for heating metal edge faces that are to be united by welding, and the invention relates more particularly to torches for heating the edge faces of open-seam tube blanks.

It is an object of the invention to provide an improved welding torch that is economical to manufacture and highly efficient in use. More specifically, the invention is a longitudinal-seam welding torch that projects flame jets directly against the edge faces of a seam cleft while sufficiently separated and then down into the cleft as the edge faces come together.

In accordance with one feature of the invention the torch has flame jet orifices directed diagonally against the edge faces of the seam cleft. By "diagonally" directed or disposed, as the term is used in the description and claims, is meant a direction which has a transverse component that makes an acute angle with a longitudinal plane through the center line of the torch face and through the center line of a seam that the torch is in position to weld. Successive orifices are directed to project flames against first one face and then the other over a portion of the length of the torch; and other orifices are disposed opposite one another over a different portion of the length of the torch so as to produce fish-tail flames that will penetrate into the seam cleft as the edge faces come too close together to be struck by the diagonal flame jets. It may be said, therefore, that another object of the invention is to provide an improved torch for concentrating the heat in the edge faces of an open-seam tube.

This application is a continuation in part of my copending application, Serial No. 152,957, filed July 10, 1937, now Patent No. 2,249,592, dated July 15, 1941.

Other objects, features and advantages of the invention will appear or be pointed out as the specification proceeds.

In the accompanying drawing, forming a part hereof:

Fig. 1 is a side elevation of a torch embodying the invention, the torch being shown in position with respect to a tube and the rolls of a welding machine.

Fig. 2 is a bottom plan view of the torch shown in Fig. 1.

Figs. 3–5 are enlarged sectional views, taken on the lines 3—3 to 5—5, respectively, of Fig. 1.

A tube blank 12, which may be either cold or preheated, comes into the welding machine between feed rolls 13 and 14. A central fin 15 on the upper feed roll 13 extends into the seam cleft and acts as a guide to control the spacing of the edge faces and to keep the cleft at the top of the tube.

Beyond the feed rolls 13 and 14, the tube blank 12 passes between two stands of confining or gathering rolls. The near roll 16 of the first stand is shown, but the corresponding and cooperating roll on the far side of the tube blank is not visible in Fig. 1. The second stand of confining or gathering rolls includes the near roll 18 and a corresponding roll on the far side of the tube blank.

The rolls 16 and 18 turn on substantially vertical axles that are adjusted to control the width of the seam cleft and counteract the tendency of the cleft to open up when the heat is applied. A torch 20 is located over the seam along that portion of the tube blank that is passing through and beyond the confining rolls 16 and 18.

Immediately beyond the torch 20, the tube blank enters a pass between welding rolls 22 and 23. It is a feature of this invention that the rearward end of torch 20 extends well into the space under the upper welding roll 22, and heats the seam edges up to, or substantially to, the point at which the seam edges come into actual contact. That point of contact depends upon the adjustment of the welding rolls and the relative size of the tube blank and welding roll pass.

When the size of the tube pass between the welding rolls 22, 23 is less than the peripheral dimension of the tube, then the heating and tube speed must be correlated to produce substantial melting, and a flash is squeezed out from between the cleft edges when they come together in the welding rolls.

With the tube pass between the welding rolls substantially equal to the circumference of the tube blank, and the intensity of the heating agencies so correlated with the speed of travel of the tube blank that there is only a superficial melting of the edge faces of the seam cleft, the welding rolls bring the edge faces of the seam cleft into contact, but it is not necessary that the rolls exert any substantial pressure on the tube. Without actual fusion pressure is essential.

For welding by melting down quantities of the edge portions of the metal into a pool or puddle which subsequently hardens to make the weld, it is satisfactory to apply heat to the metal back of the edge faces. For faster "surface fusion" methods of welding it is essential that the heat be concentrated in the edge faces, and the torch of this invention obtains such concentration by projecting heating flames directly against the edge faces.

The torch 20 comprises an elongated block with a recess or channel 25 in its bottom face and extending lengthwise along the center of the bottom face. Transverse notches 26 extend across the face and give it a ribbed surface that is less subject to the building up of slag formations when welding gassy metal. In the illustrated embodiment of the invention, the channel 25 has diverging sides that slope at angles of 45° to the torch face, and the notches 26 are of equal depth with the channel.

Starting at the front end of the torch (the left end in Figs. 1 and 2), and for a distance somewhat more than one-half the length of the torch face, there is a flame jet orifice opening through a wall of the channel between each of the notches 26. Alternate flame-jet orifices are located in opposite sides of the channel 25. These orifices in the right and left sides of the channel 25 are indicated by the reference characters 28 and 29, respectively.

Fig. 3 shows the way in which a flame jet 31 from each of the orifices 28 is projected directly against the left edge face of the seam cleft, and Fig. 4 shows how a flame jet 32 from each of the orifices 29 is similarly projected against the right edge face of the seam cleft.

Toward the rearward end of the torch face there are jet orifices 33, similar to the jet orifices 28, but there is a jet orifice 33 between every notch 26 along this rearward portion of the torch face. Similarly, there is a jet orifice 34, similar to the jet orifices 29 but located between every notch instead of alternate notches.

The jet orifices 33 and 34 being opposite one another and converging as they approach the seam cleft comprise impingement-type "fishtail" burners, the flames from the respective orifices deflecting each other to produce the fishtail flame 35 which is narrow in the direction of the seam cleft width and broad in the direction of the seam cleft length, and penetrates into the narrowing cleft ahead of the welding rolls, as shown in Fig. 5.

The last few jet orifices 37 not only converge toward the seam cleft, like orifices 33 and 34, but they also slope rearwardly with successive orifices at greater angles to a normal to the plane of the torch face so that the flame jets are projected beyond the end of the torch and well into the welding roll pass and into contact with the metal up until the time that the edges actually come together to make the weld.

The jet orifices on the right-hand side of the torch open into a gas distributing chamber 38, and those on the left-hand side of the torch open into a gas distributing chamber 39. Each of these chambers comprises a long groove milled in the side of the torch block and covered by a plate 41 which is countersunk into the torch body and silver-soldered to make a gas-tight chamber. An oxy-fuel gas mixture is supplied to the distributing chambers 38 and 39 through conduits 42 and 43, respectively.

There are openings in the end walls of the torch in line with the distributing chambers 38 and 39, and these openings are closed by plugs 44 which can be removed to permit cleaning of the distributing chambers. The torch block is cooled by water or other cooling fluid, circulated through a chamber 46. The cooling fluid flows into and out of the chamber 46 through the pipes 47 and 48.

The torch has brackets 50 by which it is held in position on a tube welding machine. The brackets 50 are slotted to permit a limited vertical adjustment of the torch.

The preferred embodiment of the torch has been illustrated and its use in the progressive welding of open-seam tube blanks described, but the invention is not limited to tube welding, and some features can be used without others.

I claim:

1. A welding torch comprising an elongated block, a lengthwise extending recess in each side of the block, a cover closing each of the recesses to form a distributing chamber, means for supplying a fuel-gas mixture to each of the distributing chambers, a channel in one face of the block, said channel having diverging side walls and extending lengthwise of the face, flame jet orifices opening through both sides of the channel at spaced apart points lengthwise of the channel, the jet orifices on each side being located at different distances from the end of the channel than the jet orifices on the other side along a portion of the length of the torch, and the other jet orifices along another portion of the length of the torch opening through one side of the channel opposite the orifices on the other side of said channel so that their flame jets converge into resultant fishtail flames, the last few of said other jet orifices having successively greater rearward inclination with respect to a normal to the plane of the torch face so that the last flame jets are projected rearwardly and beyond the end of the torch, and transverse notches extending across the torch face and across the channel at regions between flame jet orifices.

2. A welding torch including an elongated block tip having two rows of orifices on opposite sides of a center plane of the torch, angularly related faces on opposite sides of the center plane and through which the orifices of the respective rows open, said faces being so related to one another that they form walls of a recess that extends lengthwise of the tip, a distributing chamber for the right-hand row of orifices and located within the tip and on the right-hand side of the center plane, another distributing chamber for the left hand row of orifices and located within the tip and on the left-hand side of the center plane, said tip having the orifices in two groups along its length, the right- and left-hand orifices of the first group sloping downwardly toward the center plane on opposite sides of said plane and the right-hand orifices being spaced different distances from the end of the tip than the left-hand orifices so that the right and left-hand orifices of the first group are in an alternating or staggering relation with one another; and the right and left-hand orifices of the other group being located opposite one another and converging downwardly, with corresponding orifices on the right-hand side of the center plane at the same distance from the end of the tip as the orifices on the left-hand side of the plane, and with the right and left-hand orifices of said other group close together so that oxy-acetylene flames projected from each pair of converging orifices contact with one another and form a flat resultant flame elongated in the direction of the length of the tip.

3. A welding torch comprising an elongated block tip having two rows of orifices opening through the bottom side of the tip with the orifices of each row located on an opposite side of a center plane of the torch, said tip having the orifices in two groups along its length, the right and left-hand orifices of the first group sloping downwardly toward the center plane on opposite sides of said plane and the right-hand orifices being spaced different distances from the end of the tip than the left-hand orifices so that the right and left-hand orifices of the first group are in an alternating or staggered relation with one another; and the right and left-hand orifices of the other group being located opposite one another and converging downwardly, with corresponding orifices on the right-hand side of the center plane at the same distance from the end of the tip as the orifices on the left-hand side of the plane, and with the right and left-hand orifices of said other group close enough together for oxy-acetylene flames projected from each pair of converging orifices to contact with one another and form a flat resultant flame elongated in the direction of the length of the tip.

JAMES L. ANDERSON.